June 21, 1960 H. O. THEYSOHN 2,941,239
MIXING MACHINE
Filed April 16, 1958 2 Sheets-Sheet 1

United States Patent Office 2,941,239
Patented June 21, 1960

---

2,941,239

MIXING MACHINE

Helmuth O. Theysohn, Hannover-Laatzen, Germany, assignor to Paul Troester Maschinenfabrik, Hannover-Wulfel, Germany, a corporation of Germany Filed Apr. 16, 1958, Ser. No. 728,881

4 Claims. (Cl. 18—2)

The mastication and mixing of rubber and plastic materials for subsequent processing has hitherto been performed chiefly by rolling mills, generally provided with two or more horizontal rolls, stacked vertically one above another and revolving towards one another at different speeds, the gaps or distances between the rolls being variable.

By the forces generated in the gap the different ingredients are masticated and mixed; they can also be plasticized and gelatinized by additional heating of the rolls.

In recent times, other machines, such as kneaders, worm-mixers and the like, have been developed for this use. Whilst these machines offer certain advantages as compared with rolling mills, they have, among others, the disadvantages that none of them can be universally applied for masticating rubber and plastic materials of any grade and composition. A kneader generally requires rolling mills or other disintegrators as subsequent equipment, because the irregular pieces of stock turned out by the kneader cannot be stored and processed in their original from.

Today the number of rolling mills used in the rubber and plastics industries exceeds by far that of other masticating machines. One of the reasons for this fact is that the high forces generated in the roll gap or nip result in a very intensive working-up and shaping of the rolled stock, by which the manufacture of high-quality products benefits.

The smaller the diameter of the rolls, the more intensive is the working-up of the stock and the less the pressure and power required.

The considerable expansion of production in the rubber industry, caused for instance by the increasing demand for motor vehicle tyres, called for increasing the capacity of the rolling mills by widening the rolls. Such increase in roll widths, of course, demanded larger roll diameters to maintain the strength of the rolls, and especially to avoid their undue deflection during operation. Since, however, the forces generated in the gap per inch of roll width also increase with the diameter of the rolls, disproportionately heavy and therefore more expensive frames for supporting the rolls were required relative to the increase in capacity of the mill.

With hollow rolls, the great wall thickness necessary for sufficient strength made it difficult to secure strict and rapid control of stock temperature by cooling or heating means, which can almost exclusively be applied in the interior of the rolls. Owing to this fact, the working speed and, therefore, the capacity of rubber mixing mills, for instance, could not be increased, as it proved impossible to remove by internal cooling means the frictional heat generated in the rolled stock by the nip forces, sufficiently rapidly to prevent vulcanization of the stock.

A further fundamental disadvantage of conventional rolling mills is the discontinuous working involved by irregular supply of material, mostly by hand, which often brings about an uneven rolled product.

Furthermore, independently of the size of the rolls, the rolled material is only subjected to pressure on a small portion of the roll circumference, viz. in the roll gap or nip, while it remains unaffected over by far the greater part of its travel.

The present invention has for its main object to provide an improved machine for masticating and mixing rubber and plastic materials, also adapted for plasticizing and gelatinizing these materials or for calendering them in the form of sheet or film stock.

One object of the invention is to provide an improved machine for these purposes, in which a working roll is arranged between at least three supporting rolls, so that the material is subjected to the rolling pressure at several portions of the working roll circumference.

A specific object is to provide a working roll of small diameter, enabling the temperature of the material to be controlled very efficiently by internal heating or cooling means acting through relatively thin walls of the working roll, which is so supported by the other rolls that it can withstand the pressure necessary for the mastication of the materials.

Another object of the invention is to provide for continuous operation of the machine, the supply of material being fed to the rolls at one end and removed at the other end.

A further object is to provide for adjustment of the period during which the material is subjected to the action of the rolls.

Other objects and advantages of the invention will hereinafter appear from the following description given with reference to the accompanying drawings, in which.

Figure 1:
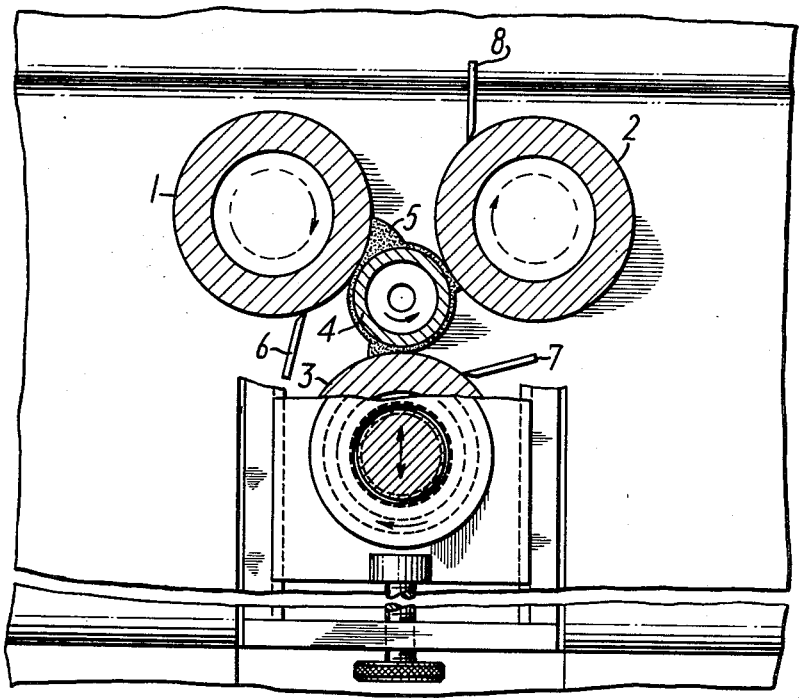
Fig. 1 is a cross-sectional view of the working roll and three supporting rolls in one embodiment of the invention.

As shown in Fig. 1, the machine comprises three supporting rolls 1, 2 and 3, centrally between which there is arranged a working roll 4, freely movable radially, onto which the stock 5 is fed; the supporting rolls are rotatably mounted in suitable bearings on a frame (not shown) but the working roll 4 can float between them according to the pressure on the material in the three gaps or nips because the opposite axle-ends of said working roll 4 are not pivoted on bearings mounted on said frame. Therefore, relating to its axle, the working roll 4 is freely movable radially within the bearing cage consisting of the said supporting rolls 1, 2 and 3 which rolls are spaced around said working roll. The diameter of the working roll is made as small as possible to ensure a good kneading effect in the roll gaps and a rapid succession of passes through the three gaps. With any asymmetric loading of the roll gaps, the working roll 4 must rest at least against two of the supporting rolls; it cannot therefore be bent or moved aside to a greater extent than the deflection of the supporting rolls, which can be made relatively large in diameter and very stiff. In consequence of these favourable conditions of loading, the wall of the working roll 4 can be reduced to a small thickness which also facilitates the strict temperature control of the stock 5 by heating or cooling means (not shown) located inside of the working roll 4.

The two upper supporting rolls 1 and 2 and the working roll 4 together form a deep inlet of funnel shape to which even granular and pulverulent material for milling and mixing can be fed successfully. Stripping knives 6, 7 and 8, bearing on the surfaces of the supporting rolls 1, 2 and 3, serve for removing single pieces of rolled stock from the supporting rolls so that those pieces can be returned to the roll gaps, until the stock 5 forms a continuous sheet on the working roll 4.

Variation of the width of the roll gaps may be obtained by adjustment of either one supporting roll, for instance the bottom roll 3, or more than one of the supporting rolls.

With the usual manner of working, in which the materials are fed to the rolling mill discontinuously, the above described arrangement would have one disadvantage, viz. that the manual feed of the materials and the removal of the finished stock are somewhat more difficult than with the usual rolling mill.

Figure 2:
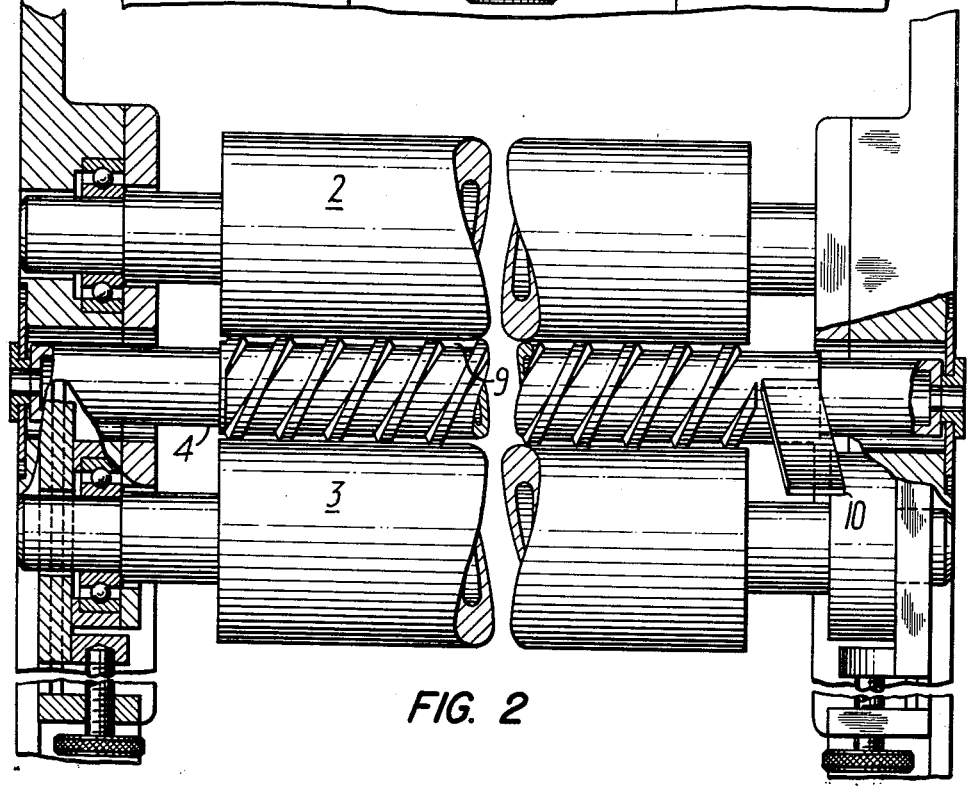
Fig. 2 is a side elevation showing the working roll provided with helical grooves; in order to show the helical grooves more clearly, only two supporting rolls are represented as contacting at diametrically opposite places on the working roll.

This drawback can be overcome and at the same time a further advantage obtained, by providing the working roll 4 with helical grooves 9, preferably flat-bottomed, as shown in Fig. 2 whereby the stock advances gradually along the roll 4 under the pressure of the three supporting rolls 1, 2 and 3. By this means, the machine becomes a continuous rolling mill, which can if desired be equipped with automatic feeding means. In a masticating or mixing operation, for instance, the starting material can be fed continuously at the left-hand end of the rolls, from which it will pass along to the right-hand end; during this travel it can be successively charged with fillers, pigments or other additions, which may be fed into the funnel-shaped inlet automatically, if desired. At the right-hand end of the working roll 4, the finished stock will be continuously stripped off from the roll by a knife 10. The length of the period, during which the stock 5 advances from one end of the rolls to the other, can be adjusted by changing the shape and pitch of the helical grooves, as well as by varying the surface speeds of the rolls. The surface speeds of the working roll and of the supporting rolls are variable independently.

Figure 3:
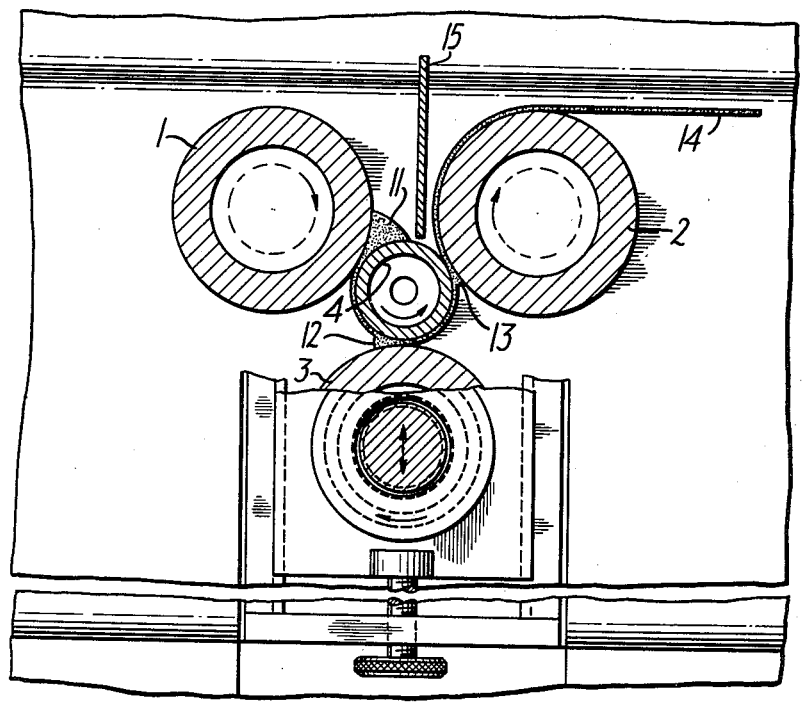
Fig. 3 is a cross-sectional view of another embodiment of the machine as arranged for calendering the rubber or plastic material.

If the machine is provided with an ungrooved but polished central roll, it may also be used as a sheeting calender, as shown in Fig. 3. In this case, the stock to be calendered is fed, for instance, into the roll gap 11; it leaves the machine after having passed the gap 12 above the supporting roll 3, and the gap 13 between the working roll 4 and the supporting roll 2, around which last it forms a sheet or film 14. It will be advisable to provide a guard plate 15 between the supporting rolls 1 and 2, in order to prevent the entering stock from coming into contact with the calendered sheet or film 14 formed around the roll 2.

Sheets or films of substantially uniform thickness or gauge, measured over the whole width of the sheet or film can be produced; owing to the small diameter of the working roll 4 and its firm support by the several rolls 1, 2 and 3, and in spite of the high pressures generated in the roll gaps, the forces tending to separate the rolls are small, and lateral deflection of the working roll 4 is impossible.

The advantages of the above mentioned machine, as compared with rolling mills of conventional design, may be summarized as follows:

(1) Increased output due to more favorable kneading effect, brought about by the small diameter of the working roll 4.

(2) Increased output obtained by having three or more gaps arranged one immediately after another on the same working roll 4.

(3) Increased output due to more intensive temperature control, as a consequence of the reduced wall-thickness of the working roll 4.

(4) Improved shape of the inlet suitable for the feed of granular or pulverulent materials or additions.

(5) Continuous operation in kneading, mixing, preheating and/or plasticizing, without stoppages for feeding the materials and removing the stock.

(6) Possibility of automatic feed of primary materials, fillers and pigments at selected stages of the stock travel along the rolls.

(7) Possibility of adjusting the period of travel along the rolls by varying the speeds of the rolls, or by changing the pitch of the helical grooves on the working roll 4.

(8) Possibility of calendering the rubber or like material; the small diameter of the working roll 4 and its relatively thin walls enable an intensive and close control of stock temperature to be obtained.

It will be obvious that the working roll 4 may be supported by more than three other rolls.

What I claim is:

1. A machine for milling rubber and plastic materials, especially for kneading, mixing and preheating of these materials or their compounds comprising a central working roll and at least three supporting rolls spaced around said working roll, said supporting rolls being rotatably mounted in bearings on the frame of said machine, at least one of said supporting rolls being adjustable toward said working roll characterized by the fact that said working roll is arranged floatingly between said supporting rolls.

2. A machine according to claim 1 characterized by the fact that the diameter of the working roll is smaller than one of the diameters of the supporting rolls.

3. A machine according to claim 1 characterized by the fact that the wall of the working roll has a smaller thickness than one of the supporting rolls.

4. A machine according to claim 1 characterized by the fact that the central working roll has a helically grooved circumference, means for feeding said plastic materials in between two of said supporting rolls at one end, and means for stripping the milled material off said working roll at the other end, the surface speed of which working roll being adjustable relating to each surface speed of the supporting rolls.

References Cited in the file of this patent

UNITED STATES PATENTS

| | | |
|---|---|---|
| 1,256,664 | Davidson | Feb. 19, 1918 |
| 1,600,119 | Macklin | Sept. 14, 1926 |
| 1,850,450 | Denmire | Mar. 22, 1932 |
| 1,930,873 | Brester | Oct. 17, 1933 |
| 2,537,395 | Brown | Jan. 9, 1951 |
| 2,551,872 | Brown | May 8, 1951 |

FOREIGN PATENTS

| | | |
|---|---|---|
| 139,095 | Sweden | Feb. 10, 1953 |